United States Patent
Miyasako

(10) Patent No.: US 9,030,566 B2
(45) Date of Patent: May 12, 2015

(54) IMAGE CAPTURING APPARATUS AND CONTROL METHOD OF THE SAME

(71) Applicant: Canon Kabushiki Kaisha, Tokyo (JP)

(72) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 13/718,483

(22) Filed: Dec. 18, 2012

(65) Prior Publication Data

US 2013/0162848 A1 Jun. 27, 2013

(30) Foreign Application Priority Data

Dec. 27, 2011 (JP) .................................. 2011-286628

(51) Int. Cl.
| | |
|---|---|
| H04N 5/228 | (2006.01) |
| G03B 17/00 | (2006.01) |
| G02B 27/64 | (2006.01) |
| H04N 5/232 | (2006.01) |

(52) U.S. Cl.
CPC ................................. *H04N 5/23287* (2013.01)

(58) Field of Classification Search
CPC .......... H04N 5/23248; H04N 5/23251; H04N 5/23254; H04N 5/23258; H04N 5/23261; H04N 5/23264; H04N 5/23267; H04N 5/2328; H04N 5/23287
USPC ................. 348/208.1–208.8, 208.11–208.13, 348/219.1; 396/50, 53, 54, 55; 382/107; 359/554–557
See application file for complete search history.

(56) References Cited

U.S. PATENT DOCUMENTS

| | | | | |
|---|---|---|---|---|
| 6,734,901 | B1 * | 5/2004 | Kudo et al. | 348/208.4 |
| 6,734,902 | B1 * | 5/2004 | Kawahara | 348/208.8 |
| 2004/0052513 | A1 * | 3/2004 | Ohkawara et al. | 396/55 |
| 2004/0201707 | A1 * | 10/2004 | Noguchi et al. | 348/208.7 |
| 2004/0238718 | A1 * | 12/2004 | Washisu | 250/201.2 |
| 2005/0018051 | A1 * | 1/2005 | Tomita et al. | 348/208.4 |
| 2005/0270380 | A1 * | 12/2005 | Tomita et al. | 348/208.99 |
| 2010/0158493 | A1 * | 6/2010 | Miyasako | 396/55 |
| 2011/0158620 | A1 * | 6/2011 | Kanayama et al. | 396/55 |

FOREIGN PATENT DOCUMENTS

JP 11-146260 5/1999

* cited by examiner

*Primary Examiner* — Sinh Tran
*Assistant Examiner* — Xi Wang
(74) *Attorney, Agent, or Firm* — Cowan, Liebowitz & Latman, P.C.

(57) ABSTRACT

An image capturing apparatus comprises: an image sensor configured to capture an image; a vibration detection unit configured to detect a vibration; a vector detection unit configured to detect a motion vector from images; a first correction unit configured to optically correct an image blur; a second correction unit configured to electrically correct the image blur; a first calculation unit configured to calculate, on the basis of the vibration, a first vibration correction amount for controlling the first correction unit; a second calculation unit configured to calculate, on the basis of the motion vector, a second vibration correction amount for controlling the second correction unit; and a control unit configured to control the first and second calculation units so that the first and second vibration correction amounts are suppressed when a vibration amount is greater than a first threshold.

9 Claims, 8 Drawing Sheets

IMAGE CAPTURING APPARATUS AND CONTROL METHOD OF THE SAME

BACKGROUND

1. Field of the Disclosure

The present invention relates to techniques for correcting vibration of an image capturing apparatus using an optical image stabilization method and an electrical image stabilization method in the image capturing apparatus.

2. Description of the Related Art

In recent years, image capturing apparatuses have been downsized and optical systems with higher magnification have been employed. The vibration or the like of such an image capturing apparatus is a major cause of degradation in the quality of an image captured by the image capturing apparatus. In view of the circumstances, a variety of blur correction functions have been proposed for correcting a blur of a captured image caused by vibration or the like of such an image capturing apparatus. Examples of conventional blur correction functions incorporated into an image capturing apparatus include a correction method in which both an optical image stabilization method and an electrical image stabilization method are used (see, for example, Japanese Patent Laid-Open No. 11-146260).

First, in the optical image stabilization method, vibration of an image capturing apparatus is detected, and an optical system for image stabilization is driven in order to cancel the detected vibration. The optical system for image stabilization causes light of an object, which enters an image sensor, to be always located at the same position on an imaging plane, thereby correcting vibration. Subsequently, in the electrical image stabilization method, a residual blur, which could not be corrected by the optical image stabilization method, is detected by obtaining a blur between images. Then, by shifting a readout region of the image so that the obtained blur between the images is cancelled, residual vibration in a low frequency is corrected. As such, it is possible to improve correction capability by using the optical image stabilization method and the electrical image stabilization method.

However, the above-described conventional method has the following problem. Optical image stabilization is to correct vibration of an image capturing apparatus by mechanically driving an optical system for image stabilization, where a correction amount is finite. Accordingly, in general, when significant vibration is added to an image capturing apparatus or the image capturing apparatus is panned, the optical image stabilization is controlled so as to achieve a reduced effect of image stabilization, in order to avoid reaching a limit of correction.

In this case, if regular electrical image stabilization is performed, it corrects a residual blur which has been increased due to the reduced effect of image stabilization in the optical image stabilization. In an electrical image stabilization method, a blur during a charge accumulation period cannot be corrected. Therefore, if an image having the increased residual blur is corrected by means of the electrical image stabilization, this will bring about a phenomenon that only a blur during a charge accumulation period is generated while an object is being stopped on a screen. This results in an extremely unnatural image.

SUMMARY

The present disclosure has been made in consideration of the above situation, and provides a method for correcting a blur with the use of an optical image stabilization method and an electrical image stabilization method, wherein optical image stabilization and electrical image stabilization are cooperatively controlled, so that a natural and smooth control of image stabilization is achieved.

According to the present disclosure, provided is an image capturing apparatus comprising: an image sensor configured to capture an image of an object formed by an optical system; a vibration detection unit configured to detect a vibration; a vector detection unit configured to detect a motion vector from images captured by the image sensor; a first correction unit configured to optically correct an image blur caused by the vibration; a second correction unit configured to correct, by changing a read-out area on the image sensor, the image blur caused by the vibration; a first calculation unit configured to calculate, on the basis of the vibration, a first vibration correction amount for controlling the first correction unit; a second calculation unit configured to calculate, on the basis of the motion vector, a second vibration correction amount for controlling the second correction unit; and a control unit configured to control (i) the first calculation unit so that the first vibration correction amount is suppressed, and (ii) the second calculation unit so that the second vibration correction amount is suppressed, when a vibration amount calculated on the basis of the vibration is greater than a first threshold.

Further, according to the present disclosure, provided is a method for controlling an image capturing apparatus, the image capturing apparatus including an image sensor configured to capture an image of an object formed by an optical system, the method comprising: a vibration detection step of detecting vibration; a vector detection step of detecting a motion vector from images captured by the image sensor; a first calculation step of calculating, on the basis of the vibration detected in the vibration detection step, a first vibration correction amount; a second calculation step of calculating, on the basis of the motion vector detected in the vector detection step, a second vibration correction amount; a first correction step of optically correcting an image blur caused by the vibration on the basis of the first vibration correction amount; a second correction step of correcting, by changing a read-out area on the image sensor, the image blur caused by the vibration on the basis of the second vibration detection amount; and a control step of controlling (i) the first calculation step so that the first vibration correction amount is suppressed, and (ii) the second calculation step so that the second vibration correction amount is suppressed, when a vibration amount calculated on the basis of the vibration is greater than a first threshold.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

The following description will discuss preferred embodiments for implementing the present invention in detail with reference to the accompanied drawings. It should be noted that the following description will discuss only a blur correction control in any one of a lateral and a longitudinal directions with respect to an image, and a description of a blur correction control in the other direction is omitted because it is equivalent to the former.

Embodiment 1

Figure 1:
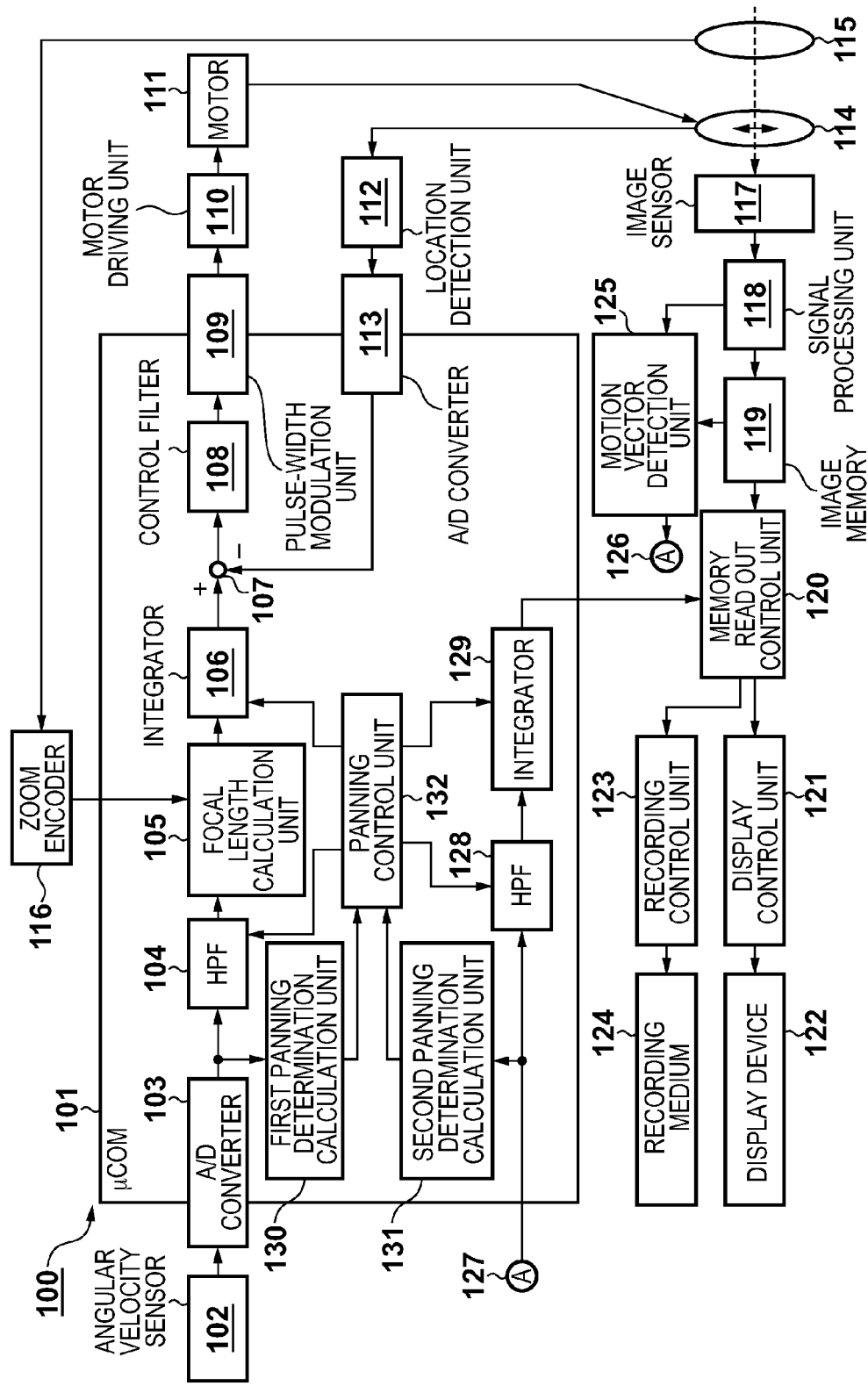
FIG. 1 is a block diagram illustrating an example of a configuration of an image capturing apparatus according to Embodiment 1.

FIG. 1 is a block diagram illustrating a configuration of a video camera as an example of an image capturing apparatus according to Embodiment 1. Each of components constituting the image capturing apparatus 100 of FIG. 1 and examples of operations thereof will be specifically described below.

An angular velocity sensor 102 senses a vibration exerted on the image capturing apparatus 100 as an angular velocity signal, and supplies the angular velocity signal to an A/D converter 103. The A/D converter 103 digitalizes the angular velocity signal from the angular velocity sensor 102, and supplies the digitalized angular velocity signal, as angular velocity data, to a high-pass filter (HPF) 104 within a microcomputer (μCOM) 101. The HPF 104, which has a function capable of changing its characteristic in any given frequency band, cuts a low frequency component contained in the angular velocity data from the A/D converter 103 so as to output a signal in a high frequency band. The HPF 104 can be configured to subtract, from the output of the A/D converter 103, a signal which has passed through a filter (LPF) for cutting a signal in a high frequency band of the output of the A/D converter 103.

An imaging optical system 115 performs an operation, such as zooming and focusing, so as to form an object image on an image sensor 117. A zoom encoder 116 detects a zoom position of the imaging optical system 115 and outputs the detected result to a focal length calculation unit 105 within the μCOM 101. The focal length calculation unit 105 calculates a focal length of the imaging optical system 115 from the output of the zoom encoder 116, and corrects the output of the HPF 104 to a value suitable for driving a correction optical system 114.

An integrator 106, which has a function capable of changing its characteristic in any given frequency band, integrates the output from the focal length calculation unit 105 so as to calculate a drive amount of the correction optical system 114.

A subtractor 107 subtracts, from the output of the integrator 106, data obtained by A/D-converting, i.e., digitalizing, at the A/D converter 113, an output from a location detection unit 112 for detecting a location of the correction optical system 114, and supplies resulting deviation data to a control filter 108. The control filter 108 is constituted by an amplifier for amplifying input data by a predetermined gain, and a phase compensation filter. The deviation data supplied from the subtractor 107 is signal-processed by means of the amplifier and the phase compensation filter in the control filter 108, and then supplied to a pulse-width modulation unit 109.

The pulse-width modulation unit 109 modulates the data supplied through the control filter 108 into a waveform (that is, a PWM waveform) that changes a duty cycle of a pulse wave, and supplies the modulated date to a motor driving unit 110. A motor 111, which is a voice coil motor for driving the correction optical system 114, is driven by the motor driving unit 110 so as to shift the correction optical system 114 in a direction perpendicular to an optical axis. The location detection unit 112 is constituted by a magnet and a hall sensor which is disposed in a location opposing the magnet. The location detection unit 112 detects a shift amount of the correction optical system 114 in the direction perpendicular to the optical axis, and supplies the detected result to the above-mentioned subtractor 107 via the A/D converter 113. Therefore, a feedback control system is configured in which a shift amount of the correction optical system 114 in the direction perpendicular to the optical axis follows up the output of the integrator 106.

The correction optical system 114 is a correction lens unit which includes a shift lens which serves as a correction member. The correction lens unit is shifted in the direction perpendicular to the optical axis so as to deflect an imaging optical axis, thereby allowing optically correcting image vibration. Consequently, on the image sensor 117, an image is formed in which a shift of an object on an imaging plane is corrected, the shift resulting from vibration or the like of an apparatus.

The image sensor 117 converts the object image formed by the imaging optical system 115 into an electric signal which serves as a captured image signal, and supplies the electric signal to a signal processing unit 118. The signal processing unit 118 generates, from the signal obtained from the image sensor 117, a video signal which conforms, for example, to an NTSC format, and supplies the video signal to a motion vector detection unit 125 and an image memory 119.

The motion vector detection unit 125 detects a motion vector between images on the basis of (i) a luminance signal included in the current video signal generated in the signal processing unit 118, and (ii) a luminance signal included in a previous video signal in one field before the current video signal, the previous video signal being stored in the image memory 119. The motion vector data detected by the motion vector detection unit 125 is supplied to an HPF 128 within the μCOM 101. Note here that the letters "A" indicated by the reference numerals 126 and 127 in FIG. 1 denote a signal flow from "A" 126 to "A" 127.

The HPF 128, which has a function capable of changing its characteristic in any given frequency band, cuts a low frequency component contained in the motion vector data, and outputs a signal in a high frequency band. The HPF 128 can be configured to subtract, from the output of the motion vector detection unit 125, a signal which has passed through a filter (LPF) for cutting a signal in a high frequency band with respect to the output of the motion vector detection unit 125. An integrator 129, which has a function capable of changing its characteristic in any given frequency band, integrates the output from the HPF 128. Then, the integrator 129 calculates a control amount for controlling a read out position of an image from the image memory 119 so as to cancel a blur of the image.

A memory read out control unit 120 determines a read out position of the image from the image memory 119 in accordance with the control amount calculated by the integrator 129. Accordingly, a video signal in which a blur is electrically corrected is outputted from the image memory 119. Further, the memory read out control unit 120 outputs the video signal to a display control unit 121, which then causes a display device 122 to display the image. Specifically, the display control unit 121 drives the display device 122, and the display device 122 displays the image by means of, for example, a liquid crystal display element (LCD). Further, upon being instructed to record the video signal by an operation unit (not illustrated) used for instructing the start or end of recording, the memory read out control unit 120 outputs the video signal to a recording control unit 123, and the recording control unit 123 causes a recording medium 124 to record the video signal. The recording medium 124 is an information recording medium, such as a magnetic recording medium (e.g., a hard disc) and a semiconductor memory.

A first panning determination calculation unit 130 generates data (angular velocity data for panning determination: vibration amount), which is to be required for a determination of whether or not the image capturing apparatus 100 is in a state of being panned (panning determination) at a panning control unit 132. The angular velocity data for panning determination can be an output per se of the A/D converter 103 or a signal obtained by processing, such as integrating, the output of the A/D converter 103. Alternatively, an output of the HPF 104 or an output of the integrator 106 can be used as the angular velocity data. Any signal can be used as the angular velocity data, provided that it is obtained with the use of an output of the angular velocity sensor 102.

A second panning determination calculation unit 131 generates data (vector data for panning determination: motion amount), which is to be required for a panning determination. The vector data for panning determination can be an output, per se, of the motion vector detection unit 125 or a signal obtained by processing, such as integrating the output of the motion vector detection unit 125. Alternatively, an output of the HPF 128 or an output of the integrator 129 can be used as the vector data. Any signal can be used as the vector data, provided that it is obtained with the use of an output of the motion vector detection unit 125.

The panning control unit 132 determines whether or not the image capturing apparatus 100 is in a state of being panned, on the basis of the outputs from the first panning determination calculation unit 130 and the second panning determination calculation unit 131. The panning control unit 132 changes coefficients of the HPF 104, the integrator 106, the HPF 128, and the integrator 129 in accordance with the determination result, as will be described later.

Figure 2:
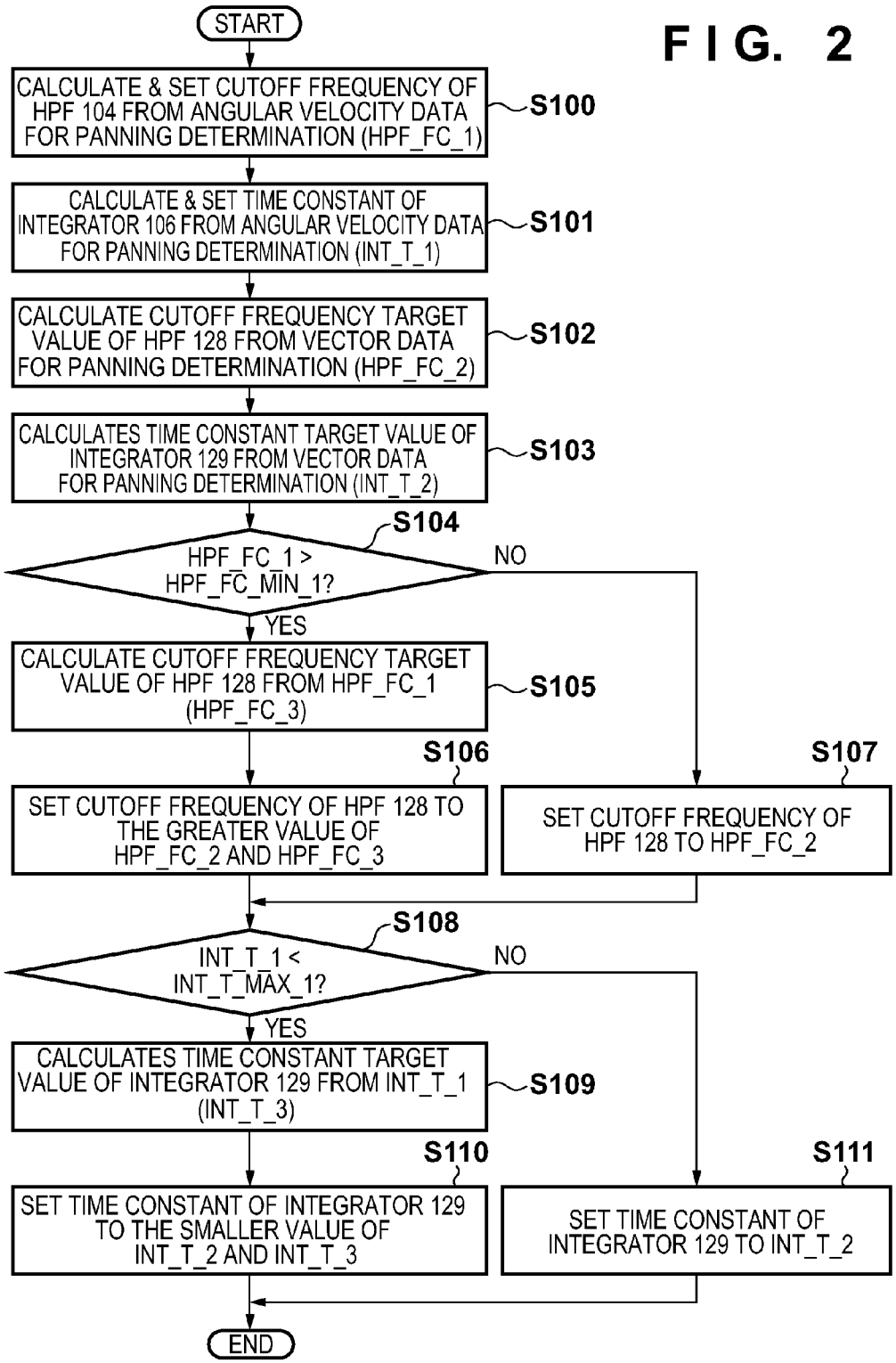
FIG. 2 is a flowchart illustrating processing performed by a panning control unit according to Embodiment 1.

The following description will discuss processing to be performed by the panning control unit 132 of Embodiment 1 in detail with reference to drawings. FIG. 2 is a flowchart illustrating a flow of the processing to be performed in the panning control unit 132. It should be noted here that the processing indicated in the flowchart of FIG. 2 is performed at intervals of, for example, 1/60 second in a repeated manner.

Figure 3A:
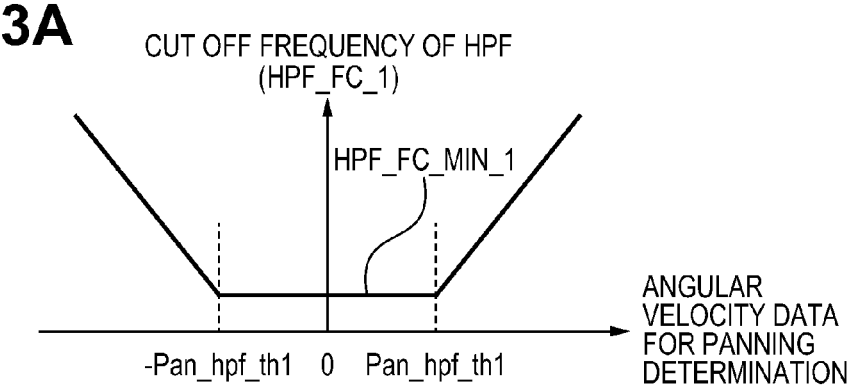
FIGS. 3A to 3D are graphs illustrating processing from S100 to S103 of FIG. 2.

In S100, a cutoff frequency HPF_FC_1 of the HPF 104 is calculated from the angular velocity data for panning determination, which is outputted from the first panning determination calculation unit 130. With reference now to a graph of FIG. 3A, it is described how to calculate the cutoff frequency HPF_FC_1. In FIG. 3A, a horizontal axis denotes angular velocity data for panning determination, and a vertical axis denotes values of the cutoff frequency HPF_FC_1. When an absolute value of the angular velocity data for panning determination becomes greater than a threshold Pan_hpf_th1 illustrated in FIG. 3A, then the panning control unit 132 determines that the image capturing apparatus 100 is in a state of being panned. And, as illustrated in FIG. 3A, the cutoff frequency HPF_FC_1 is set to a value which is higher than the minimum cutoff frequency HPF_FC_MIN_1 in accordance with the angular velocity data for panning determination. Then, a filter coefficient is set so that the cutoff frequency HPF_FC_1 of the HPF 104 equals to the calculated value, and the processing goes to S101.

Figure 3B:
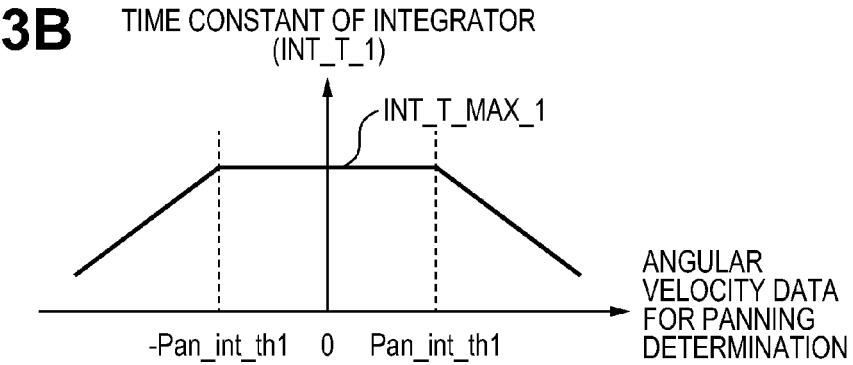

In S101, a time constant INT_T_1 of the integrator 106 is calculated from the angular velocity data for panning determination. With reference now to a graph of FIG. 3B, it is described how to calculate the time constant INT_T_1. In FIG. 3B, a horizontal axis denotes angular velocity data for panning determination, and a vertical axis denotes values of a time constant INT_T_1. When an absolute value of the angular velocity data for panning determination becomes greater than the threshold Pan_int_th1 illustrated in FIG. 3B, the panning control unit 132 determines that the image capturing apparatus 100 is in a state of being panned. And, as illustrated in FIG. 3B, the time constant INT_T_1 is set to a value which is smaller than the maximum time constant INT_T_MAX_1 in accordance with the angular velocity data for panning determination. Then, a filter coefficient is set so that the time constant INT_T_1 of the integrator 106 equals to the calculated value, and the processing goes to S102.

Figure 3C:
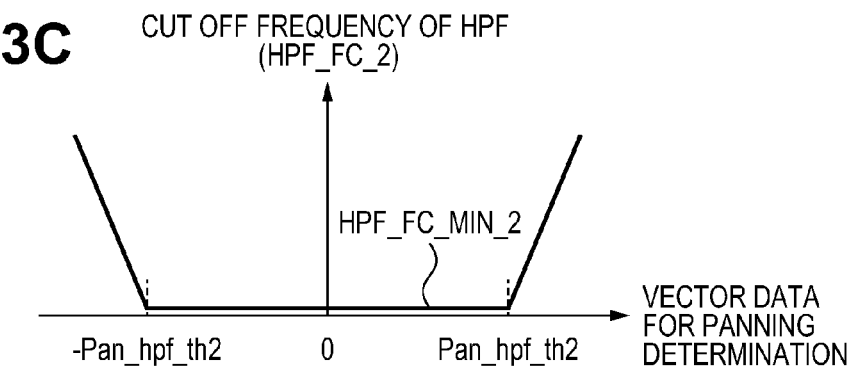

In S102, a cutoff frequency target value HPF_FC_2 of the HPF 128 is calculated from the vector data for panning determination, which is outputted from the second panning determination calculation unit 131. With reference now to a graph of FIG. 3C, it is described how to calculate the cutoff frequency target value HPF_FC_2. In FIG. 3C, a horizontal axis denotes vector data for panning determination, and a vertical axis denotes values of the cutoff frequency target value HPF_FC_2. When an absolute value of the vector data for panning determination becomes greater than a threshold Pan_hpf_th2 illustrated in FIG. 3C, the panning control unit 132 determines that the image capturing apparatus 100 is in a state of being panned. And, as illustrated in FIG. 3C, a value which is higher than the minimum cutoff frequency HPF_FC_MIN_2 is set as the cutoff frequency target value HPF_FC_2 in accordance with the vector data for panning determination. After the process in S102, the processing goes to S103.

Figure 3D:
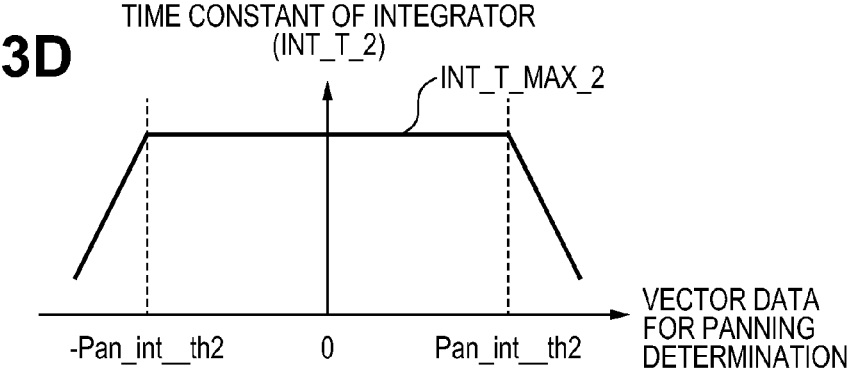

In S103, a time constant target value INT_T_2 of the integrator 129 is calculated from the vector data for panning determination. With reference now to a graph of FIG. 3D, it is described how to calculate the time constant target value INT_T_2. In FIG. 3D, a horizontal axis denotes vector data for panning determination, and a vertical axis denotes values of the time constant target value INT_T_2. When an absolute value of the vector data for panning determination becomes greater than the threshold Pan_int_th2 illustrated in FIG. 3D, the panning control unit 132 determines that the image capturing apparatus 100 is in a state of being panned. Then, a value which is smaller than the maximum time constant INT_T_MAX_2 is set as the time constant target value INT_T_2 in accordance with the vector data for panning determination as illustrated in FIG. 3D. After the process in S103, the processing goes to S104.

In S104, it is determined whether or not the cutoff frequency HPF_FC_1 of the HPF 104 calculated in S100 is greater than the minimum cutoff frequency HPF_FC_MIN_1. That is, a panning determination using the angular velocity data for panning determination is carried out to determine whether or not the cutoff frequency of the HPF 104 is changed. When the determination is NO in S104, the processing goes to S107. In S107, a filter coefficient is set so that the cutoff frequency of the HPF 128 equals to the cutoff frequency target value HPF_FC_2 calculated in S102. Then, the processing goes to S108.

Figure 4A:
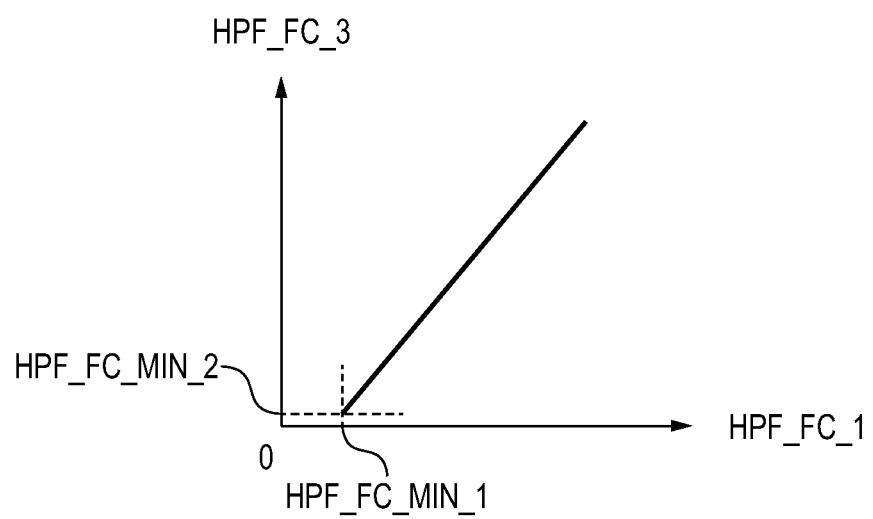
FIGS. 4A and 4B are graphs illustrating processing from S105 to S109 of FIG. 2.

On the other hand, when the determination is YES in S104, the processing goes to S105. In S105, a cutoff frequency target value HPF_FC_3 of the HPF 128 is calculated from the value of the cutoff frequency HPF_FC_1 of the HPF 104. With reference now to a graph of FIG. 4A, it is described how to calculate the cutoff frequency target value HPF_FC_3. In FIG. 4A, a horizontal axis denotes values of the cutoff frequency HPF_FC_1, and a vertical axis denotes values of the cutoff frequency target value HPF_FC_3 to be calculated. As illustrated in FIG. 4A, the calculation is performed so that a higher cutoff frequency target value HPF_FC_3 is obtained as the cutoff frequency HPF_FC_1 increases. After the process in S105, the processing goes to S106. In S106, a filter coefficient is set so that the cutoff frequency of the HPF 128 equals to the greater value of the cutoff frequency target value HPF_FC_2 calculated in S102 and the cutoff frequency target value HPF_FC_3 calculated in S105. Then, the processing goes to S108.

In S108, it is determined whether or not the integrator time constant INT_T_1 calculated in S101 is smaller than the maximum time constant INT_T_MAX_1. That is, a panning determination using the angular velocity data for panning determination is carried out to determine whether or not the time constant of the integrator 106 is changed. When the determination is NO in S108, the processing goes to S111. In S111, a filter coefficient is set so that the time constant of the integrator 129 equals to the time constant target value INT_T_2 calculated in S103. The processing thus ends.

Figure 4B:
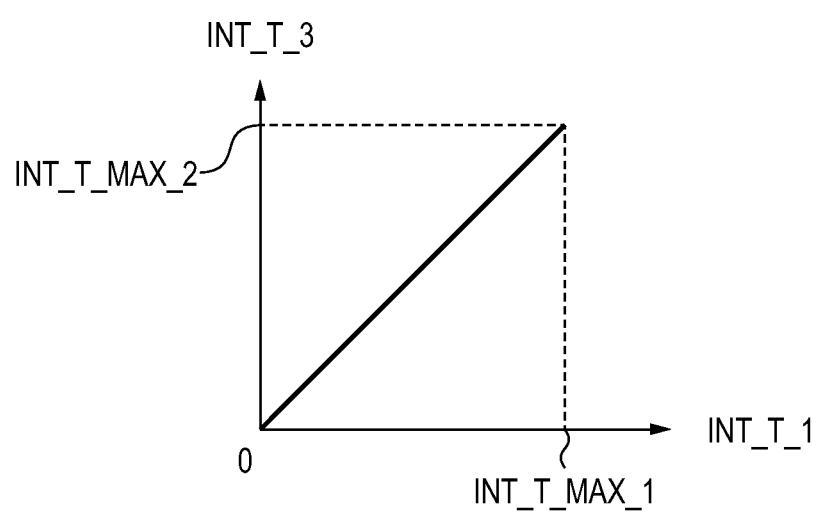

On the other hand, when the determination is YES in S108, the processing goes to S109. In S109, a time constant target value INT_T_3 of the integrator 129 is calculated from the value of the time constant INT_T_1 of the integrator 106. With reference now to a graph of FIG. 4B, it is described how to calculate the INT_T_3. In FIG. 4B, a horizontal axis denotes values of the time constant INT_T_1, and a vertical axis denotes values of the time constant target value INT_T_3 to be calculated. As illustrated in FIG. 4B, the calculation is performed so that a smaller time constant target value INT_T_3 is obtained as the time constant INT_T_1 decreases. After the process in S109, the processing goes to S110. In S110, a filter coefficient is set so that the time constant of the integrator 129 equals to the smaller value of the time constant target value INT_T_2 calculated in S103 and the time constant target value INT_T_3 calculated in S109. The processing thus ends.

The following description will discuss, with reference to FIGS. 5A to 5G, blur correction operations when the processing illustrated in FIG. 2 is performed. FIGS. 5A to 5G are graphs illustrating changes over time in operations of the HPF 104, the integrator 106, the HPF 128, and the integrator 129 in a case where a blur including a panning operation is added to the image capturing apparatus 100 of the present embodiment. During a time period from 0 to T0, vibrations are being added to the image capturing apparatus 100 while the image capturing apparatus 100 is imaging a fixed point. During a time period T0 to T1, the image capturing apparatus 100 is being panned and trying to return to image the fixed point again, reducing its panning rate. After time T1, as with the time period from 0 to T0, vibrations are being added to the image capturing apparatus 100 while the image capturing apparatus 100 is imaging the fixed point.

Figure 5A:
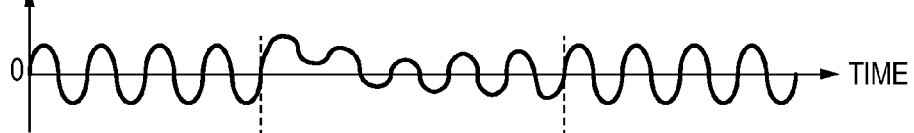
FIGS. 5A to 5G are diagrams illustrating blur correction operations when the processing illustrated in FIG. 2 is performed.
Figure 5B:
Figure 5C:
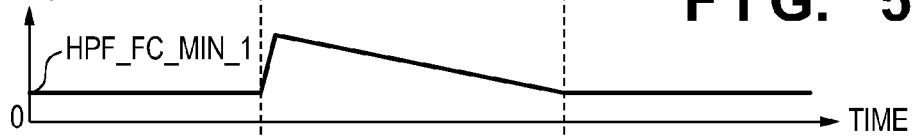
Figure 5D:
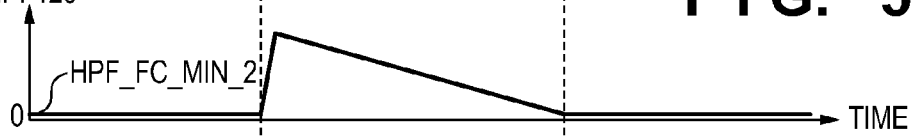
Figure 5E:
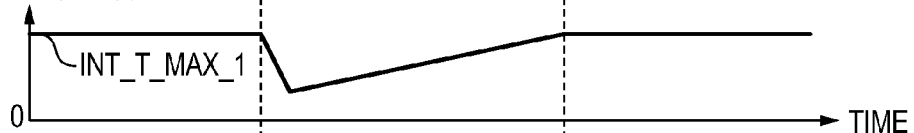
Figure 5F:
Figure 5G:
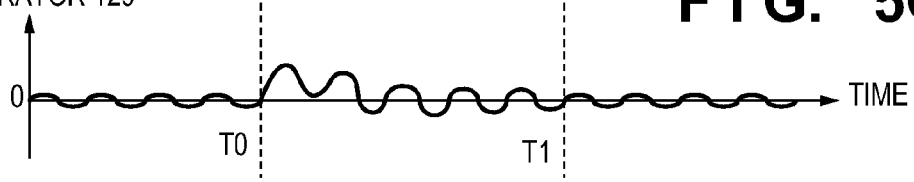

FIG. 5A is a graph illustrating change over time in the output of the integrator 106, that is, in optical correction data. FIG. 5B is a graph illustrating change over time in the residual blur obtained as the result of drive of the correction optical system 114 in accordance with the optical correction data. FIG. 5C is a graph illustrating change over time in the value of the cutoff frequency HPF_FC_1 of the HPF 104, which is set in S100 of FIG. 2. FIG. 5E is a graph illustrating change over time in the value of the time constant INT_T_1 of the integrator 106, which is set in S101 of FIG. 2. FIG. 5D is a graph illustrating change over time in the cutoff frequency of the HPF 128, which is set in S106 or S107 of FIG. 2. FIG. 5F is a graph illustrating change over time in the time constant of the integrator 129, which is set in S110 or S111 of FIG. 2. FIG. 5G is a graph illustrating change over time in the output of the integrator 129, that is, in electrical correction data.

During the time period from 0 to T0, no such determination that the image capturing apparatus 100 is in a state of being panned is made. Accordingly, the cutoff frequency of the HPF 104 has the smallest value of HPF_FC_MIN_1 (see FIG. 5C), and the time constant of the integrator 106 has the largest value of INT_T_MAX_1 (see FIG. 5E). Consequently, the output of the integrator 106 during the time period from 0 to T0 (see FIG. 5A) is in a state where effects of image stabilization are most enhanced, and a residual blur during the corresponding time period is minimized (see FIG. 5B). Note that effects of image stabilization can be enhanced by making a means for correcting image vibration (e.g., the correction optical system 114 or the memory read out control unit 120) easy to follow the vibration. In contrast, it is possible to make the means for correcting image vibration difficult to follow the vibration by setting the cutoff frequency of the HPF 104 to a greater value or setting the time constant of the integrator 106 to a smaller value in the calculation process. This allows the effects of image stabilization to be reduced.

When, at time T0, the image capturing apparatus 100 is panned, it is determined on the basis of the angular velocity data for panning determination that the image capturing apparatus 100 is in a state of being panned, as described above. Then, the cutoff frequency of the HPF 104 increases (see FIG. 5C), whereas the time constant of the integrator 106 decreases (see FIG. 5E). As the results, the output of the integrator 106 during a time period from T0 to T1 (see FIG. 5A) is in a state where the effects of image stabilization are reduced (a suppressed state), and a residual blur during the corresponding time period is increased (see FIG. 5B).

During the time period from T0 to T1, such determination that the image capturing apparatus 100 is in a state of being panned is made, on the basis of the angular velocity data for panning determination. However, this does not automatically mean that the same determination is made on the basis of the vector data for panning determination. For example, when the threshold for panning determination with respect to the vector data for panning determination is low, it is likely that a panning operation is erroneously regarded as vibration. Therefore, in a case where a wide range of correction is to be subjected to the electrical image stabilization, the threshold for panning determination with respect to the vector data for panning determination is set to a higher value. With this measure, the angular velocity data for panning determination leads to the determination that the image capturing apparatus 100 is in a state of being panned, whereas the vector data for panning determination does not lead such determination. In other words, during the time period from T0 to T1, the cutoff frequency target value HPF_FC_2 calculated in S102 of FIG. 2 remains fixed at the minimum cutoff frequency HPF_FC_MIN_2 illustrated in FIG. 3C. Similarly, during the time period from T0 to T1, the time constant target value INT_T_2 calculated in S103 of FIG. 2 remains fixed at the maximum time constant INT_T_MAX_2 illustrated in FIG. 3D.

If, during the time period from T0 to T1 of FIG. 5B, the cutoff frequency of the HPF 128 remains fixed at HPF_FC_MIN_2, and the time constant of the integrator 129 remains fixed at INT_T_MAX_2, an increased residual blur of FIG. 5B will totally be corrected electronically. Because, as described above, electrical image stabilization cannot correct a blur during a charge accumulation period, an unnatural video picture is generated in which only a blur during the accumulation period is noticeable while an image is being stopped. In addition, there occurs another phenomenon that, although an image capturing apparatus is tried to be panned, an image keeps stopping and does not move. Consequently, the image capturing apparatus has difficulty in framing.

The processing from S104 to S111 is performed in order to prevent such problems. Namely, as illustrated in FIG. 5D, the cutoff frequency of the HPF 128 increases as the cutoff frequency HPF_FC_1 of the HPF 104 increases over the minimum cutoff frequency HPF_FC_MIN_1. Further, as illustrated in FIG. 5F, the time constant of the integrator 129 decreases as the time constant INT_T_1 of the integrator 106 decreases below the maximum time constant INT_T_MAX_1. It is thus possible to electrically correct only part of the residual blur (see FIG. 5G), instead of all the residual blurs (see FIG. 5B). This allows achieving natural framing and preventing the generation of the above-mentioned unnatural video picture since a blur during the charge accumulation period occurs while an image is being moved in framing.

As has been described, in Embodiment 1, the panning determination is made using data based on the angular velocity sensor 102. And, when the cutoff frequency of the HPF 104 and the time constant of the integrator 106 are changed, then the cutoff frequency of the HPF 128 and the time constant of the integrator 129 are also changed. This allows reducing effects of electrical image stabilization (a suppressed state), preventing an unnatural video picture in which a blur during an accumulation period is noticeable while an image capturing apparatus is panning, and achieving a natural framing.

Embodiment 1 is configured such that a cutoff frequency of the HPF 128 is changed in accordance with a cutoff frequency of the HPF 104, and a time constant of the integrator 129 is changed in accordance with a time constant of the integrator 106. Note, however, that a various modifications to the configuration are possible. For example, Embodiment 1 can be configured such that a time constant of the integrator 129 is changed in accordance with a cutoff frequency of the HPF 104 or that the cutoff frequency of the HPF 128 is changed in accordance with the time constant of the integrator 106. Further, Embodiment 1 is configured such that the panning control unit 132 controls the HPF 104 and the integrator 106. Note, however, that the panning control unit 132 can control any one of the HPF 104 and the integrator 106. Similarly, the panning control unit 132 can control any one of the HPF 128 and the integrator 129.

Embodiment 2

Figure 6:
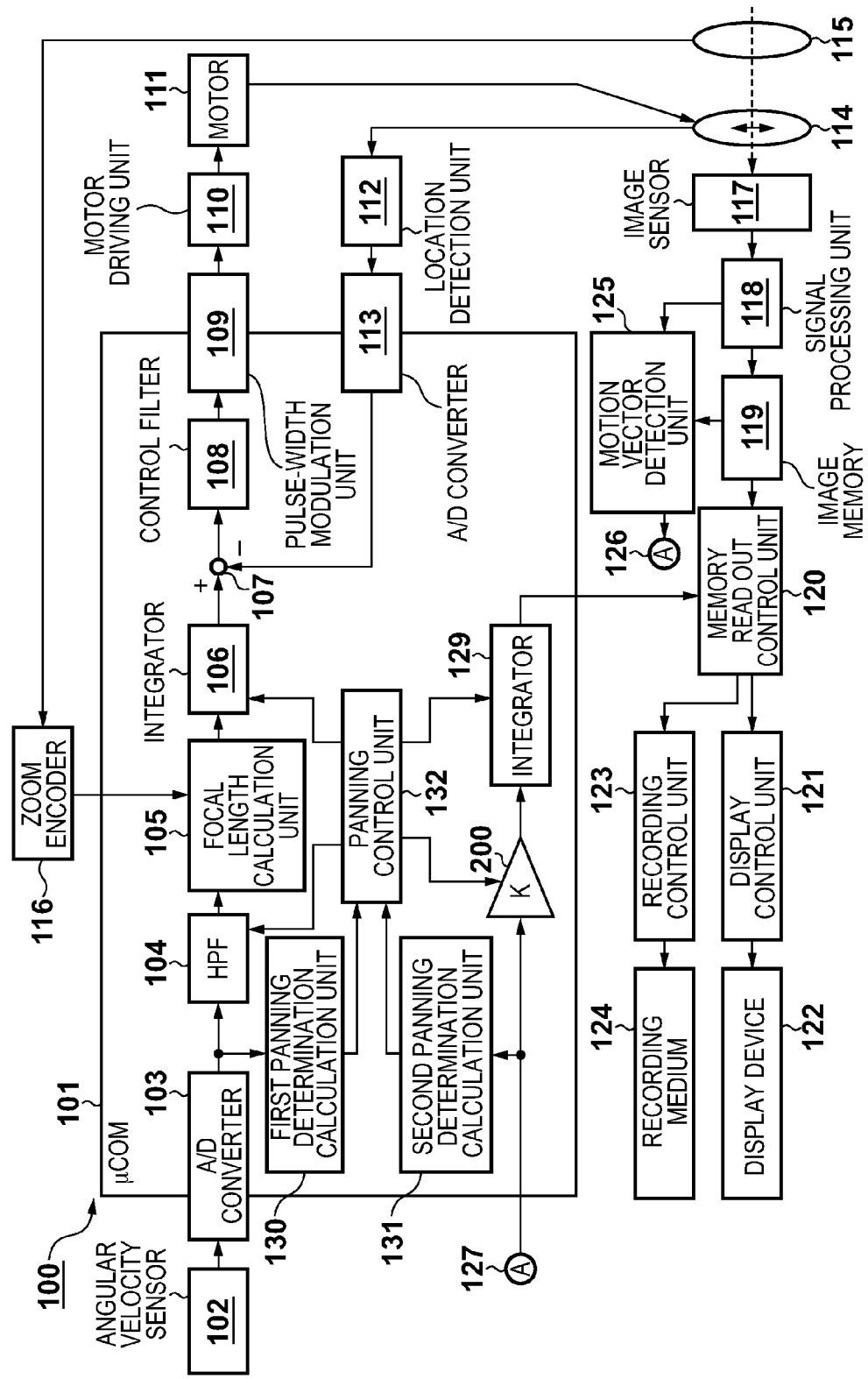
FIG. 6 is a block diagram illustrating an example of a configuration of an image capturing apparatus according to Embodiment 2.

FIG. 6 is a block diagram illustrating a configuration of a video camera as an example of an image capturing apparatus according to Embodiment 2. It should be noted that the same reference numerals are used for components of FIG. 6 which have the same configurations as those of FIG. 1, and descriptions thereof are omitted. The configuration illustrated in FIG. 6 differs from that of FIG. 1 in that a multiplier 200 is provided, instead of the HPF 128 of FIG. 1, and controlled by the panning control unit 132.

The multiplier 200 multiplies an output of the motion vector detection unit 125 by K (0≤K≤1), and outputs the product to the integrator 129. That is, when K=1, the multiplier 200 supplies the unchanged output of the motion vector detection unit 125 to the integrator 129, whereas, when 0≤K<1 (K is equal to or more than 0 and less than 1), the multiplier 200 attenuates the output of the motion vector detection unit 125 and supplies the attenuated output to the integrator 129. A function of the multiplier 200 will be described later.

Figure 7:
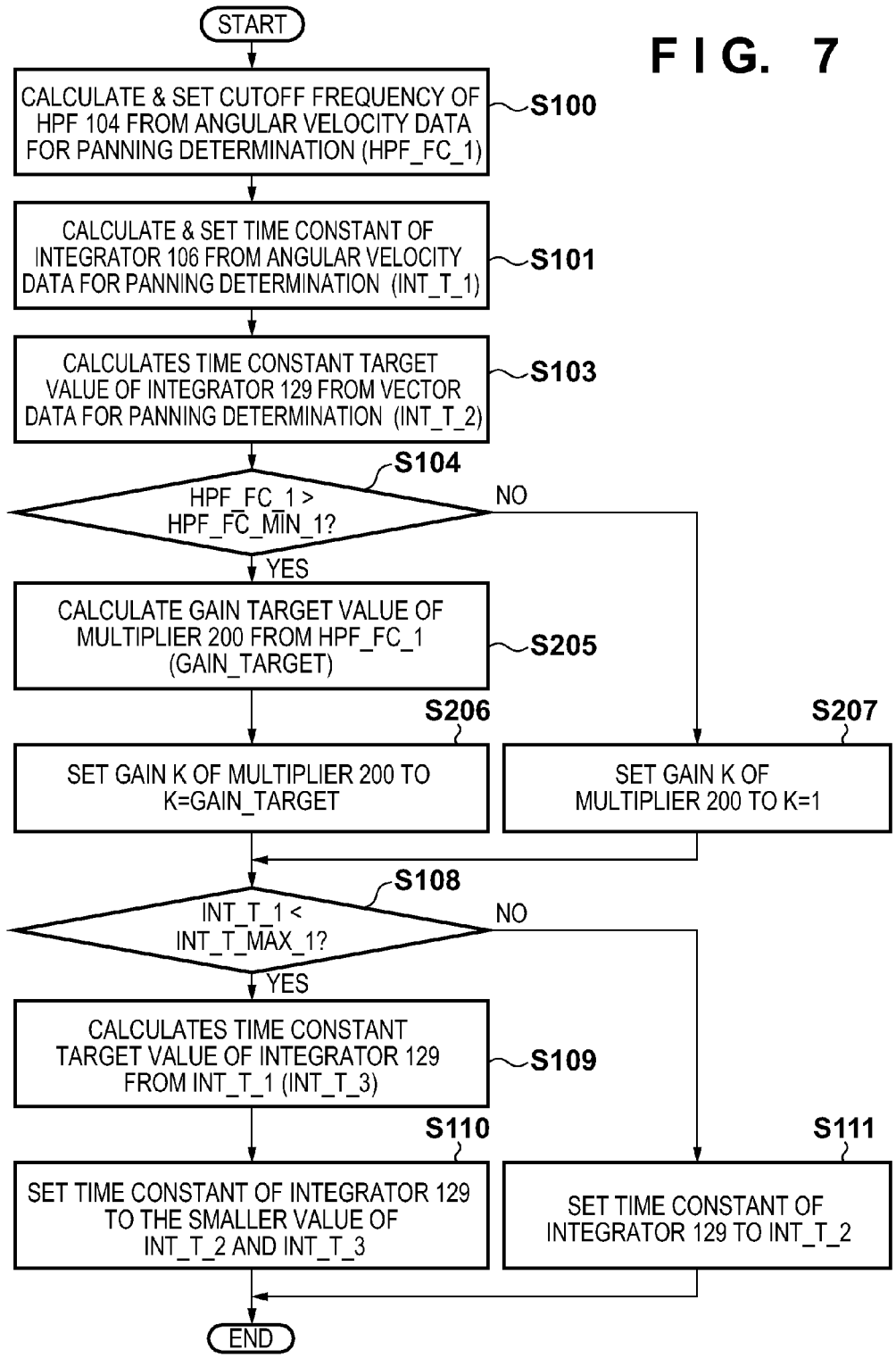
FIG. 7 is a flowchart illustrating processing performed by a panning control unit according to Embodiment 2.

The following description will discuss processing to be performed by the panning control unit 132 of Embodiment 2 in detail with reference to drawings. FIG. 7 is a flowchart illustrating a flow of the processing to be performed in the panning control unit 132. It should be noted here that processing indicated in the flowchart of FIG. 7 is performed at intervals of, for example, 1/60 second in a repeated manner. Note also that the same reference numerals are added to processes common in the flowcharts of FIGS. 2 and 6.

Embodiment 2 is similar to Embodiment 1 in that the time constant of the integrator 129 is changed in response to a change in time constant of the integrator 106. Whereas, Embodiment 2 differs from Embodiment 1 in that a gain of the multiplier 200 is changed in response to a change in cutoff frequency of the HPF 104. The corresponding processes are steps S205 to S207. As compared with FIG. 2, processes in S100 to S103 in Embodiment 2 are equivalent to those in Embodiment 1, except that no process in S102 is performed in Embodiment 2, and descriptions thereof are omitted.

In S104, when it is determined that the cutoff frequency HPF_FC_1 of the HPF 104 calculated in S100 is not greater than the minimum cutoff frequency HPF_FC_MIN_1, then the processing goes to S207. In S207, a gain K of the multiplier 200 is set to 1. That is, the output of the motion vector detection unit 125, which is not changed, is supplied to the integrator 129.

Figure 8:
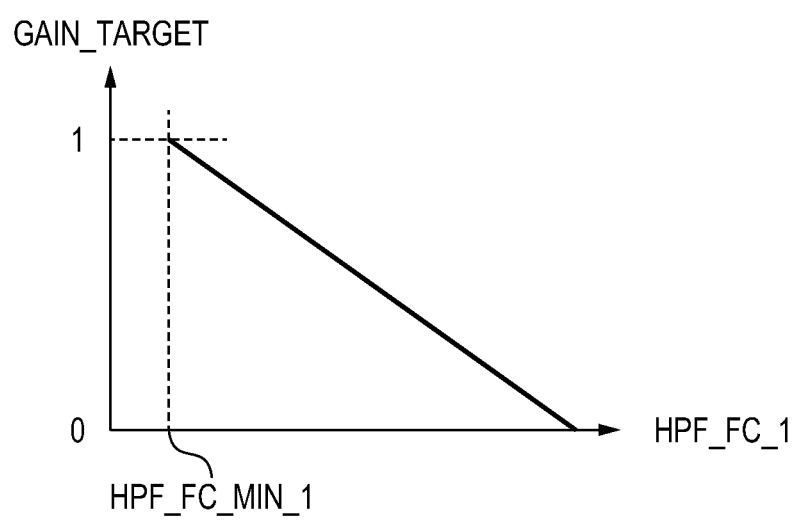
FIG. 8 is a graph illustrating processing in S205 of FIG. 7.

On the other hand, when it is determined that the cutoff frequency HPF_FC_1 is greater than the minimum cutoff frequency HPF_FC_MIN_1 in S104, then the processing goes to S205. In S205, a gain target value GAIN_TARGET of the multiplier 200 is calculated from the value of the cutoff frequency HPF_FC_1. With reference now to a graph in FIG. 8, it is described how to calculate the gain target value GAIN_TARGET. In FIG. 8, a horizontal axis denotes values of the cutoff frequency HPF_FC_1, and a vertical axis denotes value of the gain target value GAIN_TARGET to be calculated. As illustrated in FIG. 8, the calculation is performed so that a smaller gain target value GAIN_TARGET is obtained as the cutoff frequency HPF_FC_1 increases. After the process in S205, the processing goes to S206, where a gain of the multiplier 200 is set to the gain target value GAIN_TARGET calculated in S205.

After the processes in S206 and S207, the processing goes to processes from S108 to S111, which are equivalent to those in FIG. 2 and whose descriptions are therefore omitted.

Differing from Embodiment 1 in which a cutoff frequency of the HPF 128 is set to a higher value as a cutoff frequency of the HPF 104 increases, Embodiment 2 is characterized in that a gain of the multiplier 200 is set to a smaller value as a cutoff frequency of the HPF 104 increases. Setting the cutoff frequency of the HPF 128 to a higher value means to increase an attenuation rate of a gain, in a low frequency band, of an output of the motion vector detection unit 125. Whereas, setting the gain of the multiplier 200 to a smaller value means to increase attenuation rate of a gain, in total frequency band, of the output of the motion vector detection unit 125.

Embodiment 1, which is configured such that the cutoff frequency of the HPF 128 is set to a higher value as the cutoff frequency of the HPF 104 increases, is aimed to prevent an unnatural video picture which is caused by a situation in which effects of image stabilization in electrical image stabilization are kept enhanced while effects of image stabilization in optical image stabilization are reduced (a suppressed state). Setting the cutoff frequency of the HPF 128 to a higher value and setting the gain of the multiplier 200 to a smaller value are the same in that effects of image stabilization in electrical image stabilization are reduced (a suppressed state). Therefore, the same effects as that of Embodiment 1 can be achieved. That is, it is possible to achieve natural framing and to prevent an unnatural video picture in which a blur during an accumulation period is inevitably noticeable while an image is being stopped.

Embodiment 2 is configured such that a gain of the multiplier 200 is changed in accordance with a cutoff frequency of the HPF 104, and a time constant of the integrator 129 is changed in accordance with a time constant of the integrator 106. Note, however, that various modifications to the configuration are possible. For example, Embodiment 2 can be configured such that a gain of the multiplier 200 is changed in accordance with a time constant of the integrator 106. Further, Embodiment 2 is configured such that the panning control unit 132 controls the HPF 104 and the integrator 106. Note, however, that the panning control unit 132 can control any one of the HPF 104 and the integrator 106. Similarly, the panning control unit 132 can control any one of the multiplier 200 and the integrator 129.

The present embodiments have been described in detail with reference to the preferred embodiments, however, the present invention is not limited to the specific ones, and various modifications are included in the present embodiments, without departing from the summary of the present invention. Any parts of such embodiments can suitably be combined with each other.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2011-286628, filed on Dec. 27, 2011 which is hereby incorporated by reference herein in its entirety.

What is claimed is:

1. An image stabilization apparatus comprising:
   a vector detection unit configured to detect a motion vector from images captured by an image sensor;
   a first calculation unit configured to calculate, on the basis of a vibration detected by a vibration detection unit, a first vibration correction amount for controlling a first correction unit to optically correct an image blur by the vibration;
   a second correction unit configured to correct, by changing a position of a partial area to be cropped from the images captured by the image sensor, the image blur caused by the vibration detected by the vibration detection unit;
   a second calculation unit configured to calculate, on the basis of the motion vector, a second vibration correction amount for controlling the second correction unit; and
   a control unit configured to control (i) the first calculation unit so that the first vibration correction amount is suppressed, and (ii) the second calculation unit so that the second vibration correction amount is suppressed, in a case where a vibration amount calculated on the basis of the vibration is greater than a first threshold,
   wherein the control unit controls the second calculation unit so that the second vibration correction amount is suppressed regardless of whether or not the vibration amount is greater than the first threshold if a motion amount calculated on the basis of the motion vector is greater than a predetermined second threshold, and that the second vibration correction amount is not suppressed in a case where the vibration amount is equal to or less than the first threshold and the motion amount is equal to or less than the second threshold.

2. The image stabilization apparatus according to claim 1, wherein the first calculation unit includes a first high-pass filter, and the control unit changes a cutoff frequency of the first high-pass filter to a frequency that is greater than a first minimum cutoff frequency.

3. The image stabilization apparatus according to claim 1, wherein the first calculation unit includes a first integrator, and the control unit changes a time constant of the first integrator to a time constant that is smaller than a first maximum time constant.

4. The image stabilization apparatus according to claim 1, wherein the second calculation unit includes a second high-pass filter, and the control unit changes a cutoff frequency of the second high-pass filter to a frequency that is greater than a second minimum cutoff frequency.

5. The image stabilization apparatus according to claim 1, wherein the second calculation unit includes an amplifier, and the control unit sets a gain of the amplifier to a value that is equal to or more than 0 and less than 1.

6. The image stabilization apparatus according to claim 1, wherein the second calculation unit includes a second integrator, and the control unit changes a time constant of the second integrator to a time constant that is smaller than a predetermined second maximum time constant.

7. A method for controlling an image stabilization apparatus comprising:
   a vector detection step of detecting a motion vector from images captured by an image sensor;
   a first calculation step of calculating, on the basis of the vibration detected by a vibration detection unit, a first vibration correction amount for controlling a first correction step of optically correcting an image blur by the vibration;
   a second correction step of correcting, by changing a position of a partial area to be cropped from the images captured by the image sensor, the image blur caused by the vibration detected by the vibration detection unit;
   a second calculation step of calculating, on the basis of the motion vector, a second vibration correction amount for controlling the second correction step; and
   a control step of controlling (i) the first calculation step so that the first vibration correction amount is suppressed, and (ii) the second calculation step so that the second vibration correction amount is suppressed, in a case where a vibration amount calculated on the basis of the vibration is greater than a first threshold,
   wherein the control step the control step controls the second calculation step so that the second vibration correction amount is suppressed regardless of whether or not the vibration amount is greater than the first threshold if a motion amount calculated on the basis of the motion vector is greater than a predetermined second threshold, and that the second vibration correction amount is not suppressed in a case where the vibration amount is equal to or less than the first threshold and the motion amount is equal to or less than the second threshold.

8. An image stabilization apparatus comprising:
   a vector detection unit configured to detect a motion vector from images captured by an image sensor;
   a first correction unit configured to optically correct an image blur caused by the vibration;
   a first calculation unit configured to calculate, on the basis of a vibration detected by a vibration detection unit, a first vibration correction amount for controlling a first correction unit to optically correct an image blur caused by the vibration;

a second correction unit configured to correct, by changing a position of a partial area to be cropped from the images captured by the image sensor, the image blur caused by the vibration detected by the vibration detection unit;

a second calculation unit configured to calculate, on the basis of the motion vector, a second vibration correction amount for controlling the second correction unit; and a control unit configured to control (i) the first calculation unit so that the first vibration correction amount is suppressed, and (ii) the second calculation unit so that the second vibration correction amount is suppressed, in a case where panning is determined, wherein the control unit controls the second calculation unit so that the second vibration correction amount is suppressed regardless of whether or not the panning is determined if a motion amount calculated on the basis of the motion vector is greater than a predetermined second threshold, and that the second vibration correction amount is not suppressed in a case where the motion amount is equal to or less than the second threshold and the panning is not determined.

9. A method for controlling an image capturing stabilization apparatus, comprising:

a vector detection step of detecting a motion vector from images captured by an image sensor;

a first calculation step of calculating, on the basis of a vibration detected by a vibration detection unit, a first vibration correction amount for controlling a first correction step of optically correcting an image blur caused by the vibration;

a second correction step of correcting, by changing a position of a partial area to be cropped from the images captured by the image sensor, the image blur caused by the vibration detected by the vibration detection unit;

a second calculation step of calculating, on the basis of the motion vector, a second vibration correction amount for controlling the second correction step; and a control step of controlling (i) the first calculation step so that the first vibration correction amount is suppressed, and (ii) the second calculation step so that the second vibration correction amount is suppressed, in a case where panning is determined, wherein the control step controls the second calculation step so that the second vibration correction amount is suppressed regardless of whether or not the panning is determined if a motion amount calculated on the basis of the motion vector is greater than a predetermined second threshold, and that the second vibration correction amount is not suppressed in a case where the motion amount is equal to or less than the second threshold and the panning is not determined.

* * * * *